W. G. PANCOAST AND W. J. GROTENHUIS.
AUTOMOBILE BUMPER ATTACHING HANGER.
APPLICATION FILED SEPT. 9, 1921.
1,423,874.
Patented July 25, 1922.
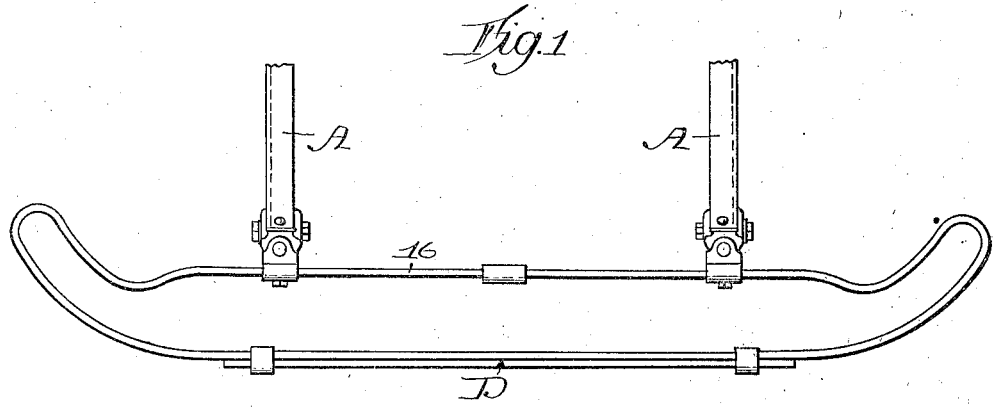
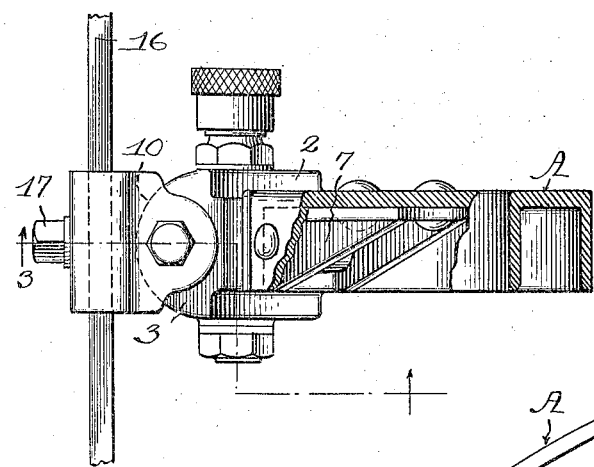
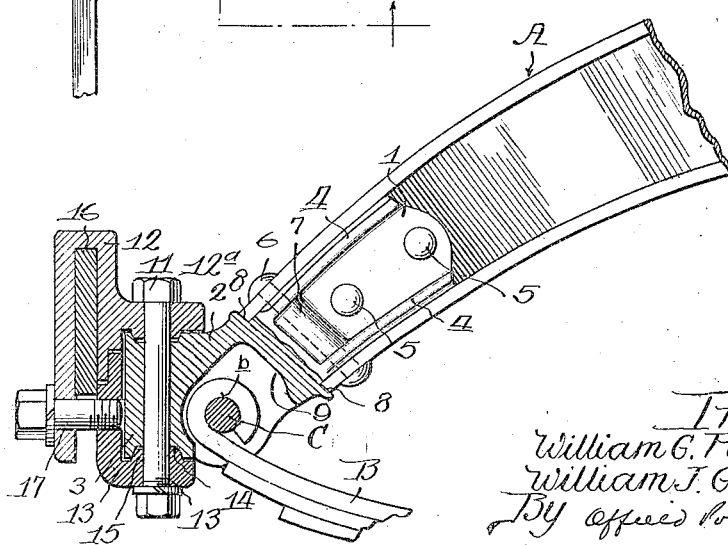
Inventors,
William G. Pancoast and
William J. Grotenhuis
By their Attys.

UNITED STATES PATENT OFFICE.

WILLIAM G. PANCOAST, OF WILMETTE, AND WILLIAM J. GROTENHUIS, OF CHICAGO, ILLINOIS, ASSIGNORS, BY MESNE ASSIGNMENTS, TO BIFLEX PRODUCTS COMPANY, A CORPORATION OF DELAWARE.

AUTOMOBILE BUMPER-ATTACHING HANGER.

1,423,874.  Specification of Letters Patent.  Patented July 25, 1922.

Application filed September 9, 1921. Serial No. 499,473.

*To all whom it may concern:*

Be it known that we, WILLIAM G. PANCOAST and WILLIAM J. GROTENHUIS, both citizens of the United States, and residents of Wilmette and Chicago, respectively, in the county of Cook and State of Illinois, have invented certain new and useful Improvements in Automobile Bumper-Attaching Hangers, of which the following is a specification.

This invention relates to improvements in automobile bumper attaching hanger designed to be built into the frame of an automobile, and comprising as an integral part thereof a member to which the bumper may be directly attached.

The object of the invention is to provide a hanger in the nature of a metal fitting which will facilitate the mounting of bumpers upon automobiles, and in such a manner as to treat the bumper as a standard and fixed member rather than as an accessory to be applied or not as the whim of the owner dictated. At the present time, the actual protective value of a bumper is rapidly approaching universal recognition, and it follows, therefore, that it is desirable to simplify and standardize the method of attachment of such bumpers, making them more nearly an integral part of the automobile by eliminating the usual clamps and brackets and other comparatively insecure devices for attaching the same to the frame members.

A further object of the invention is to provide a fitting to which a bumper may be directly attached, and yet so designed as not to present an unsightly appearance in the absence of a bumper.

The construction of a hanger will now be described in detail, and with reference to the accompanying drawings, in which a preferred form of fitting is illustrated as follows:

Figure 1 is a top plan view of the forward ends of the frame members of an automobile equipped with hangers, and a bumper attached thereto.

Figure 2 is an enlarged top plan view of a single hanger applied, and

Figure 3 is a view in side elevation showing a part of the hanger in vertical section as taken on line 3—3 of Figure 2.

The usual practice in automobile frame construction is to provide at the front ends of the longitudinal frame members A—A an integral head to which the forward end of the spring B is connected by means of a spring bolt C just as shown in Figure 1. In equipping an automobile with a hanger constructed in accordance with the invention, the frame members are cut just short of the usual head which supports the end of the spring, and a complete bumper attaching hanger is secured, which includes in a single integral member a shank 1 by which the hanger is joined to the frame member, a head 2 serving the same purpose as the corresponding part eliminated, and finally the bumper attaching portion 3 especially designed to receive the parts acting to connect the bumper proper to the fitting. As already suggested, the parts 1, 2 and 3 are formed in a single metal casting or forging and preferably applied by the use of rivets or other means of permanent connection.

The shank 1 extends longitudinally inward from the end of the channel shaped frame member 1 fitting within the slightly tapered end portions thereof, and consisting of a vertical plate bearing flatwise against the vertical web of the frame member, and provided with integral transverse reinforcing webs 4—4 adjacent the longitudinal edges thereof, and tapering from front to rear. A suitable number of rivets 5—5 extend through the shank and the vertical web of the frame member, as well as a rivet 6 extending transversely through the horizontal webs near the end of the frame members, and an enlarged portion 7 at the forward end of the shank 1. The head 2 projects immediately beyond the end of the frame member A and consists of a body having shoulders 8—8 abutting against the end of the frame members, and a large cavity 9 opening downwardly and adapted to house the end of the spring B. The spring bolt C passes transversely through the head engaging an eye *b* formed at the end of the spring B.

The bumper supporting portion 3 of the fitting consists of a forwardly and laterally extending member having a rounded semicircular front face 10. Extending vertically through the portion 3 is a bore $3^a$ through which a bolt 11 extends, and adapted to pivotally support parts of the bumper attaching members, consisting of an inverted U-shaped clip preferably made in two separable parts; namely, an upper member 12 and a lower member 13 having interfitting connection along the front face of the portion 3, and provided with ears 12ª and 13ª respectively which engage the upper and under surfaces of the portion 3 and are pivotally connected thereto by means of the bolt 11. To complete the pivotal mounting of the parts 12 and 13 upon the fitting, there are provided annular sockets or depressions 14—14 formed around the ends of the bore 3ⁿ into which fit complementary annular bosses 15—15, which form bearings between the pivotally connected parts. The members 12 and 13 of the clip are shaped concave to conform to the convex front face of the projecting portion 3 and have substantially abutting engagement therewith, as well as sliding contact when the parts are relatively rotated.

The clip member 12, as before suggested, is of inverted U-shape, forming a downwardly facing slot in which is retained the rear transverse bar 16 passing through an aperture in the lower edge of the outer portion of the clip member 12, and below the bar 16, and anchored in a tapered hole formed in the lower clip member 13.

It is contemplated that the automobile as manufactured will be equipped with the hanger and with or without the bumper attached. In the latter instance, the projecting portion 3 of the fitting forms a rounded projection at the ends of the frame member, which may be utilized or not as the purchaser desires. The depressions or sockets 14—14, as well as the bolt hole 3ª, may be temporarily closed and concealed by ornamental caps secured over the top and bottom by means of a bolt. In this manner the bumper attaching means are available at any time the owner makes use of them, yet the absence of the bumper does not present an unfinished or unsightly appearance.

The application of the bumper is a comparatively simple operation involving the removal of any parts of temporary character, and the mounting of the clip members upon the projecting end of the hanger, together with the bumper proper.

The bumper being of the so-called resilient type; that is, made up of resilient bars which by their nature will undergo a certain degree of distortion under impact with an attendant rotation of the clip about the axis of the bolt 11. The construction of the clip and end portion 3 of the fitting is therefore such as to take the shock of impact through the contacting surfaces and the interfitting sockets and bosses 14 and 15, thereby relieving the bolt of such force which would otherwise tend to bend or shear the same, rendering it unusable and necessitating its replacement. In short, the construction herein disclosed provides a strong, yet flexible mounting for a bumper without the usual points of weakness found in bumper attaching members.

Having described the construction and function of the bumper attaching hanger, the novel and useful features thereof may be further specified in the appended claims:

1. A hanger adapted for permanent connection with the end of an automobile frame member, comprising a shank fixed to said frame member, an integral head extending beyond the end of said frame member, a bumper attaching member pivotally supported upon said head, by means of a pivot bolt, said head and attaching member being provided with interfitting bosses and depressions forming pivotal bearings therefor.

2. A hanger adapted to be permanently connected at the end of a longitudinal frame member of an automobile, and comprising a shank bolted to said frame member, an integral head beyond the end of said frame member, a bumper attaching member, a pivot bolt connecting said attaching member with said head, said member and head having bearing contact throughout radial bearing surfaces, and interfitting bosses and depressions, forming pivotal bearings therefor.

3. A hanger adapted to be permanently connected to the end of an automobile frame member, and comprising a shank portion, a head beyond the end of said frame member provided with a forwardly facing and curved abutment face, and bumper attaching members adapted to be pivotally connected with said head, through the medium of a pivot bolt, and provided with a concave bearing surface adapted for contact with said abutment face.

4. A hanger adapted to be permanently connected to the end of an automobile frame member, and comprising a shank portion, a head beyond the end of said frame member provided with a forwardly facing and curved abutment face, and bumper attaching members adapted to be pivotally connected with said head through the medium of interfitting bosses and depressions, and a pivot bolt, and to engage said abutment face.

5. A hanger adapted to be permanently connected at the end of a longitudinal frame member of an automobile, and comprising a shank bolted to said frame member, an integral head beyond the end of said frame member provided with a bumper attaching portion shaped and bored to have attaching members of a bumper pivotally connected thereto by means of a pivot bolt, and to contact along complementary curved faces, and interfitting sockets and bosses provided on said pivotally connected members and surrounding said pivot bolt.

6. A hanger adapted to be permanently connected to the end of an automobile frame member and comprising a shank portion, a head adapted to extend beyond the end of said frame member, and a bumper attaching member having pivotal connection with said head through the medium of interfitting complementary tapered bosses and sockets, and a pivot bolt.

7. A hanger adapted to be permanently connected with the end of an automobile frame member, and comprising a shank portion adapted to be bolted to said frame member, an integral head extending beyond the end of said frame member, and provided with a curved abutment face and a vertically disposed central bore having tapered sockets at either end thereof, and bumper attaching members pivotally mounted upon said head, and provided with a complementary abutment face and bosses, the latter engaging said sockets, and a pivot bolt passing through said attaching members and said bore.

In witness whereof, we hereunto subscribe our names this 7th day of Sept. A D., 1921.

WILLIAM G. PANCOAST.
WILLIAM J. GROTENHUIS.